United States Patent
Hegde et al.

(10) Patent No.: US 12,302,072 B2
(45) Date of Patent: May 13, 2025

(54) MULTIPLE FLEXIBLE TIPS FOR A HEARING ASSISTANCE DEVICE

(71) Applicant: Eargo, Inc., San Jose, CA (US)

(72) Inventors: Nuthan Hegde, Sunnyvale, CA (US); Jonathan Sarjeant Aase, Incline Village, NV (US); Daniel Shen, Palo Alto, CA (US)

(73) Assignee: Eargo, Inc., San Jose, CA (US)

( * ) Notice: Subject to any disclaimer, the term of this patent is extended or adjusted under 35 U.S.C. 154(b) by 277 days.

(21) Appl. No.: 17/854,596

(22) Filed: Jun. 30, 2022

(65) Prior Publication Data

US 2023/0007416 A1    Jan. 5, 2023

Related U.S. Application Data

(60) Provisional application No. 63/217,114, filed on Jun. 30, 2021.

(51) Int. Cl.
*H04R 25/00* (2006.01)
*H02J 50/10* (2016.01)

(52) U.S. Cl.
CPC .......... *H04R 25/656* (2013.01); *H02J 50/10* (2016.02); *H04R 25/50* (2013.01); *H04R 25/554* (2013.01); *H04R 25/65* (2013.01); *H04R 25/654* (2013.01); *H04R 25/658* (2013.01); *H04R 2225/025* (2013.01); *H04R 2225/31* (2013.01)

(58) Field of Classification Search
CPC .. H04R 25/656; H04R 25/654; H04R 25/658; H04R 2225/025

USPC ......................................... 381/312, 322, 324
See application file for complete search history.

(56) References Cited

U.S. PATENT DOCUMENTS

| | | |
|---|---|---|
| 9,167,363 B2 | 10/2015 | Michel et al. |
| 9,432,781 B2 | 8/2016 | Herscher |
| 9,936,311 B2 | 4/2018 | Herscher |
| 10,097,936 B2 | 10/2018 | Barrett et al. |
| 10,284,977 B2 | 5/2019 | Shen et al. |
| 10,334,370 B2 | 6/2019 | Herscher |
| 10,771,883 B2 | 9/2020 | Aase et al. |
| 10,785,579 B2 | 9/2020 | Aase et al. |
| 2019/0230450 A1* | 7/2019 | Aase .................... H04R 25/405 |

* cited by examiner

*Primary Examiner* — George C Monikang
(74) *Attorney, Agent, or Firm* — Rutan & Tucker, LLP

(57) ABSTRACT

The flexible attachable tip is manufactured to repeatedly connect as well as disconnect to a body of a hearing assistance device. The flexible attachable tip is manufactured to have two or more offset layers of flexible earmolds. The tip has a dome-shaped earmold that is separated by an air gap from offset layers of inner earmolds. Each layer of ear mold has multiple bendable members with an air vent constructed into the bendable members for that earmold. Air space is formed in between each of the individual bendable members making up the flexible earmold for a given layer of the offset layers. The flexible earmolds including their bendable members bend to a deformed state in order to secure the hearing assistance device in position inside an ear canal, which prevents the device from falling out of an ear, while still providing both a sound path and an airflow path through the ear canal.

22 Claims, 7 Drawing Sheets

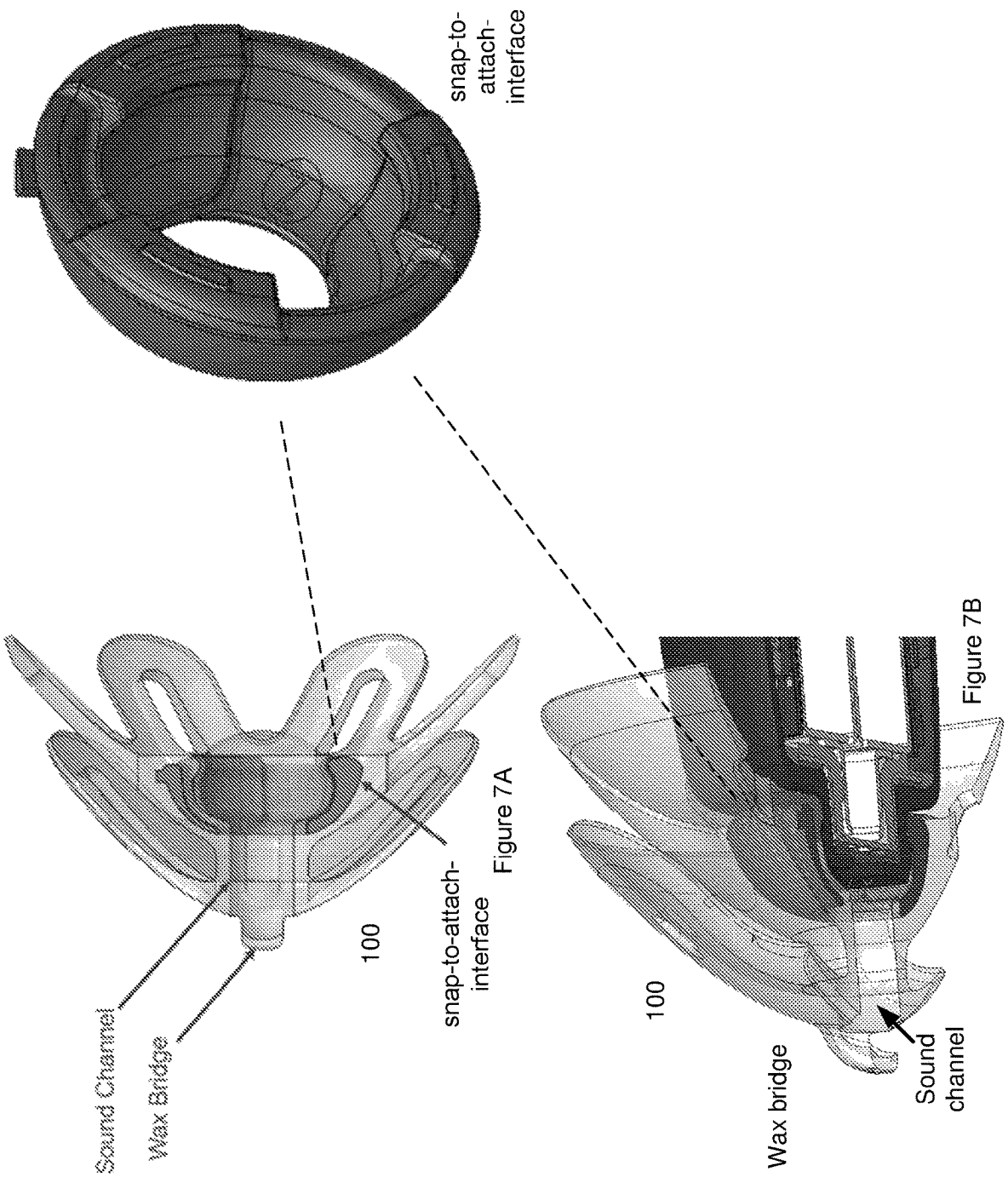

MULTIPLE FLEXIBLE TIPS FOR A HEARING ASSISTANCE DEVICE

RELATED PATENT APPLICATIONS

This patent application claims priority to and benefit of U.S. Provisional Application No. 63/217,114, filed 30 Jun. 2021, entitled An Improved Hearing Assistance System, the disclosure of each of which is hereby expressly incorporated by reference herein in its entirety.

NOTICE OF COPYRIGHT

A portion of the disclosure of this patent application contains material that is subject to copyright protection. The copyright owner has no objection to the facsimile reproduction by anyone of the software engine and its modules, as it appears in the United States Patent & Trademark Office's patent file or records, but otherwise reserves all copyright rights whatsoever.

FIELD

Embodiments of the design provided herein generally relate to hearing assistance systems and methods. For example, embodiments of the design provided herein can relate to hearing aids.

BACKGROUND

Hearing aids work best if the user wants to wear the hearing aid and can wear the hearing aid comfortably. Also, a person's hearing loss is different with each person.

Also, sometimes an electronic "in-the-ear" (ITE) hearing aid device inserted into the ear of the user can be made to fit within the ear and ear canal of the particular user. A hearing aid system that blocks the ear canal almost entirely can cause a problem known as the occlusion effect. The occlusion effect is caused by the increased transmission of sound by bone conduction when the ear canal is blocked and ear conduction is impeded. This occlusion effect results in a user hearing sounds which are unnatural and uncomfortable for the user. For example, the user's voice can sound unnaturally higher than normal.

SUMMARY

Provided herein in some embodiments is a hearing assistance system such as a hearing aid.

In an embodiment, a flexible attachable tip is constructed to repeatedly connect as well as disconnect to a body of a hearing assistance device. The flexible attachable tip is constructed to have two or more offset layers of flexible earmolds. The tip has a dome-shaped earmold that is separated by an air gap from offset layers of inner earmolds. Each layer of earmold has multiple bendable members with an air vent constructed into the bendable members for that earmold. Air space is formed in between each of the individual bendable members making up the flexible earmold for a given layer of the offset layers. The flexible earmolds including their bendable members are constructed to bend to a deformed state in order to secure the hearing assistance device in position inside an ear canal, which prevents the hearing assistance device from falling out of an ear, while still providing both a sound path and an airflow path through the ear canal.

In an embodiment, a set of flexible attachable tips are made to attach to a same instance of the hearing aid. The flexible attachable tips couple, via a common clip connection with a snap-to-attach-interface, to the hearing aid. Each different type of flexible attachable tip is made to be specifically constructed in physical dimensions of individual bendable members and a shape of the individual bendable members for that type of flexible attachable tip to eliminate multiple different hearing aid problems by allowing a user to select a best type of flexible attachable tip option from the set of two or more types of flexible attachable tips available to the user of the hearing aid. Depending on what the user is planning on doing, the user can select the best type of flexible attachable tip option from the set of two or more types of flexible attachable tips available to the user of the hearing aid by factoring in i) a specific hearing environment the user will be in, as well as ii) a user's own hearing loss profile, as well as iii) physical characteristics of the user's own ear canal such as their ear's wax build up, their ear's moisture levels, etc.

These and other features of the design provided herein can be better understood with reference to the drawings, description, and claims, all of which form the disclosure of this patent application.

DRAWINGS

The drawings refer to some embodiments of the design provided herein as well as with the additional documents filed with this document which form this provisional patent application.

FIGS. 4A to 4D illustrate diagrams of an example set of two or more types of flexible attachable tips that couple via a common clip connection with a snap-to-attach-interface to the hearing assistance device, where each different type of stock hearing aid tip is specifically constructed to eliminate multiple different hearing aid problems by allowing a user to select a best type of flexible attachable tip option from the set of two or more types of flexible attachable tips available to the user, by factoring in i) a specific hearing environment the user will be in, as well as ii) a user's own hearing loss profile, as well as iii) physical characteristics of the user's own ear canal.

FIGS. 5A to 5D illustrate diagrams of an example set of 1) earmolds that are a clover-style and shaped earmold with multiple bendable members and 2) earmolds that are a petal-style and shaped earmold with multiple bendable members.

Figure 6:
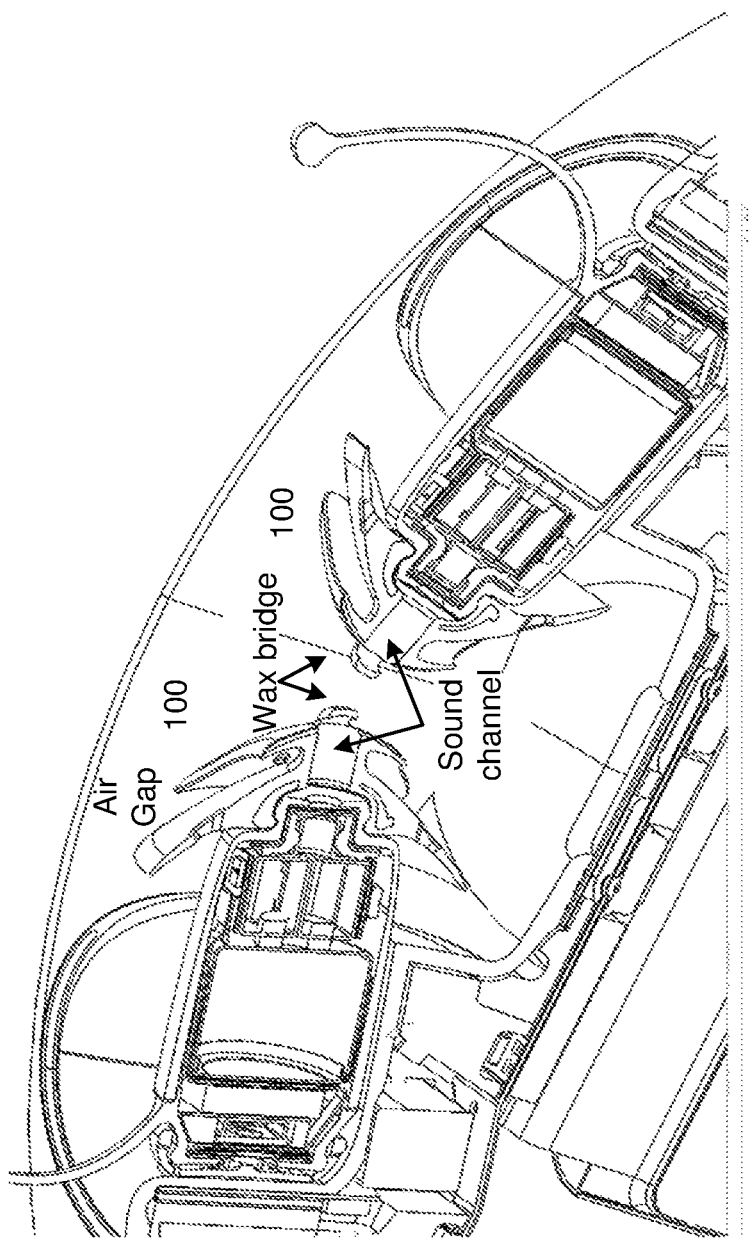

FIG. 6 illustrates a block diagram of an example of the flexible attachable tip that has a hollow cored-out center of the hearing aid tip in order to provide a channel for amplified sound to pass from a speaker in the hearing assistance device into the ear.

FIGS. 7A and 7B illustrate diagrams of example flexible attachable tips with i) a clover-style and shaped earmold and ii) a petal-style and shaped earmold that are made of silicone that is over molded over a snap-to-attach-interface made of a hardened material in order to repeatedly connect as well as disconnect to the body of a hearing assistance device.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as first hearing aid can be made. However, the specific numeric reference should not be interpreted as a literal sequential order but rather interpreted that the first hearing aid is different than a second hearing aid. Thus, the specific details set forth are merely exemplary. The specific details can be varied from and still be contemplated to be within the spirit and scope of the present design. The term coupled is defined as meaning connected either directly to the component or indirectly to the component through another component.

Open and Occluded Style Hearing Aid Tip Fitting for an In-the-Ear Canal Hearing Assistance Device Such as a Hearing Aid, Wireless Ear Bud, Etc.

Again, hearing assistance devices work best if the user wants to wear the hearing assistance device and can wear the hearing assistance device comfortably. Therefore, this hearing assistance device can use multiple different types of flexible attachable tip 100 options available for different sound environments as well as available for different levels of comfort depending upon the physical activity the user will be engaged in as well as to allow the best fit performance for the activity that the user will be engaged in.

Also, a person's hearing loss is different with each person. Therefore, each person has corresponding hearing needs that are unique to that individual person. Each person may have big ears, small ears, wider ear canals, narrow ear canals, etc. Each person may have different levels of hearing loss. Each person may have hearing loss in different frequency ranges within the audio frequency band. Therefore, the hearing assistance device cooperates with various types of flexible attachable tips 100 to connect to the body of the hearing assistance device.

The design relates to features and methods for a novel mechanical design of an open and occluded style hearing aid tip fitting for an in-the-ear canal hearing assistance device, such as a hearing aid, wireless ear bud, etc.

Figure 1:
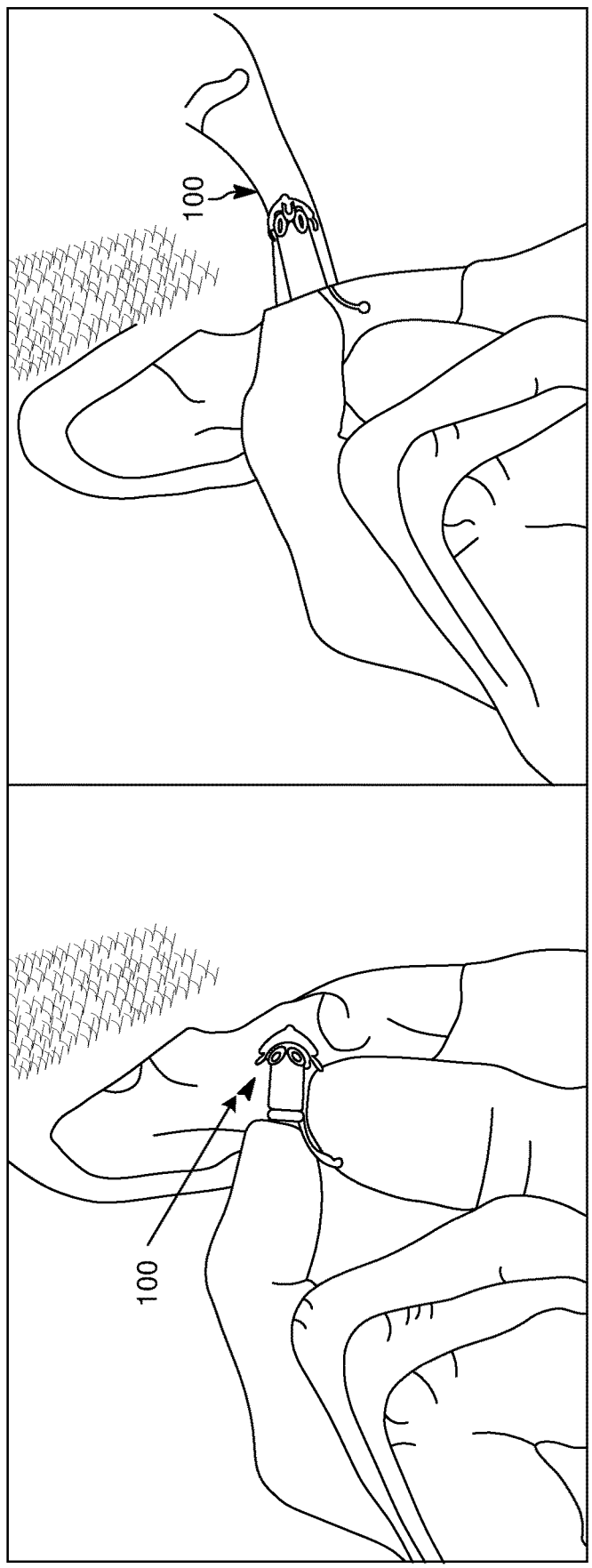
FIG. 1 illustrates a diagram of an example flexible earmold including its bendable members bending to a deformed state in order to secure the hearing assistance device in position inside the ear canal, which prevents the hearing aid from falling out of an ear, while still providing both a sound path and an airflow path through the ear canal.

FIG. 1 illustrates a diagram of an example flexible earmold including its bendable members bending to a deformed state in order to secure the hearing assistance device in position inside the ear canal, which prevents the hearing aid from falling out of an ear, while still providing both a sound path and an airflow path through the ear canal. The flexible attachable tip 100 is the initial component of the hearing assistance device to enter the ear canal of a person/user. Different forms of flexible attachable tips 100 have been created so that the fit for that particular person may be as comfortable as possible, as functional as possible for that particular user, and provide the best audio solution for that person. By providing a set of two or more types of flexible attachable tips 100 that are comfortable and provide different functionality, such as different tips that aid in different levels of hearing loss, will allow individuals using these flexible attachable tips 100 to live to the fullest extent. Some different designs of flexible attachable tips 100 will be more comfortable and some designs of the flexible attachable tips 100 will lead to better sound clarity. Even for a given person, different types of flexible attachable tips 100 can be used in different hearing environments to improve both that person's comfort and sound clarity. Each of the flexible attachable tips 100 discussed below (e.g., occluded clover-style and shaped earmolds as well as open petal-style and shaped earmolds) will be interchangeable on a same hearing aid device for that individual.

Figure 2B:
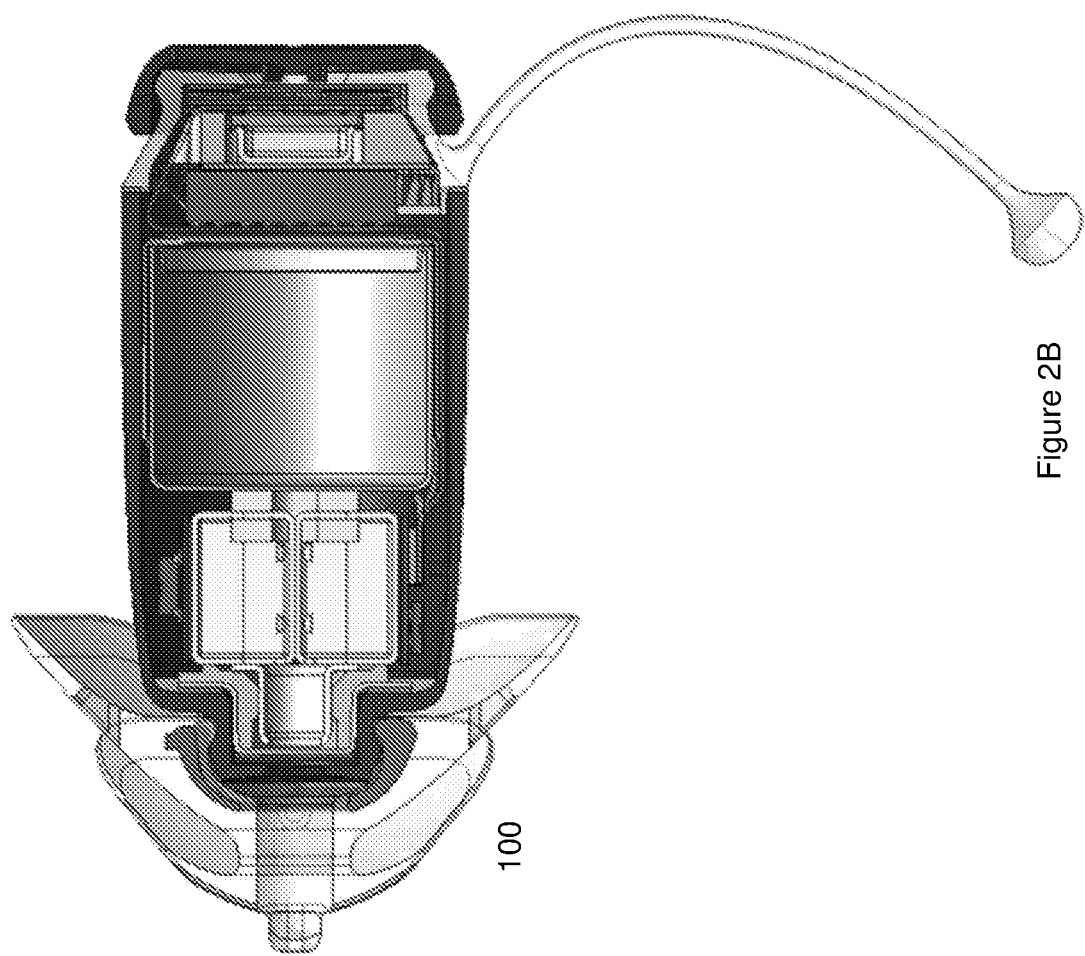
FIGS. 2A and 2B illustrate block diagrams of an example of a flexible attachable tip constructed to repeatedly connect as well as disconnect to a body of a hearing assistance device.
Figure 2A:
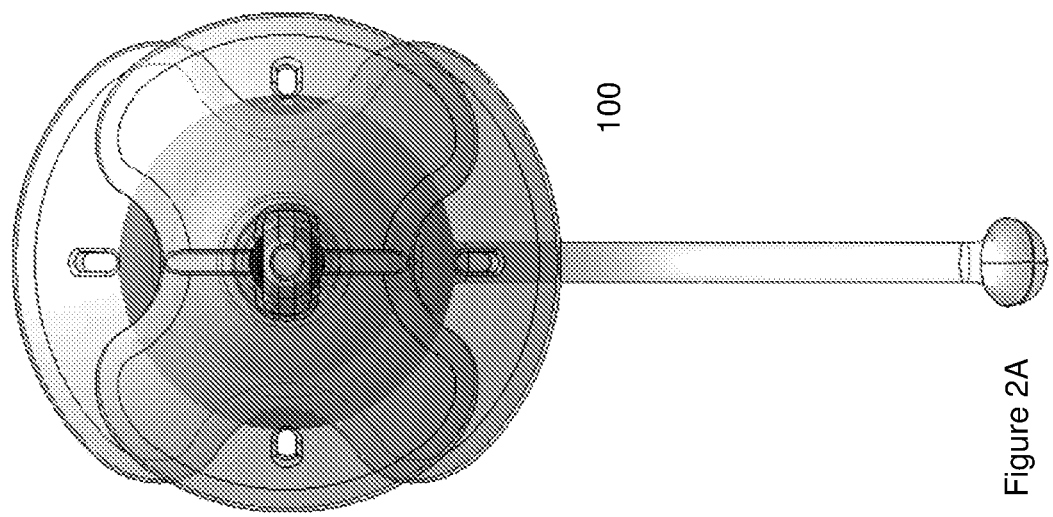

FIGS. 2A and 2B illustrate block diagrams of an example of a flexible attachable tip constructed to repeatedly connect as well as disconnect to a body of a hearing assistance device. FIG. 2A illustrates a straight on view of an example flexible attachable tip 100 as it would be inserted into an ear canal of a user. FIG. 2B illustrates a side view of the same example flexible attachable tip 100 constructed to repeatedly connect as well as disconnect to (e.g., attach onto and off of) the body of a hearing assistance device. At approximately the neck of the hearing assistance device, the snap-to-attach-interface (e.g., cup) of the flexible attachable tip 100 will snap onto and off of the socket attachment at the neck of the hearing assistance device.

Figure 3:
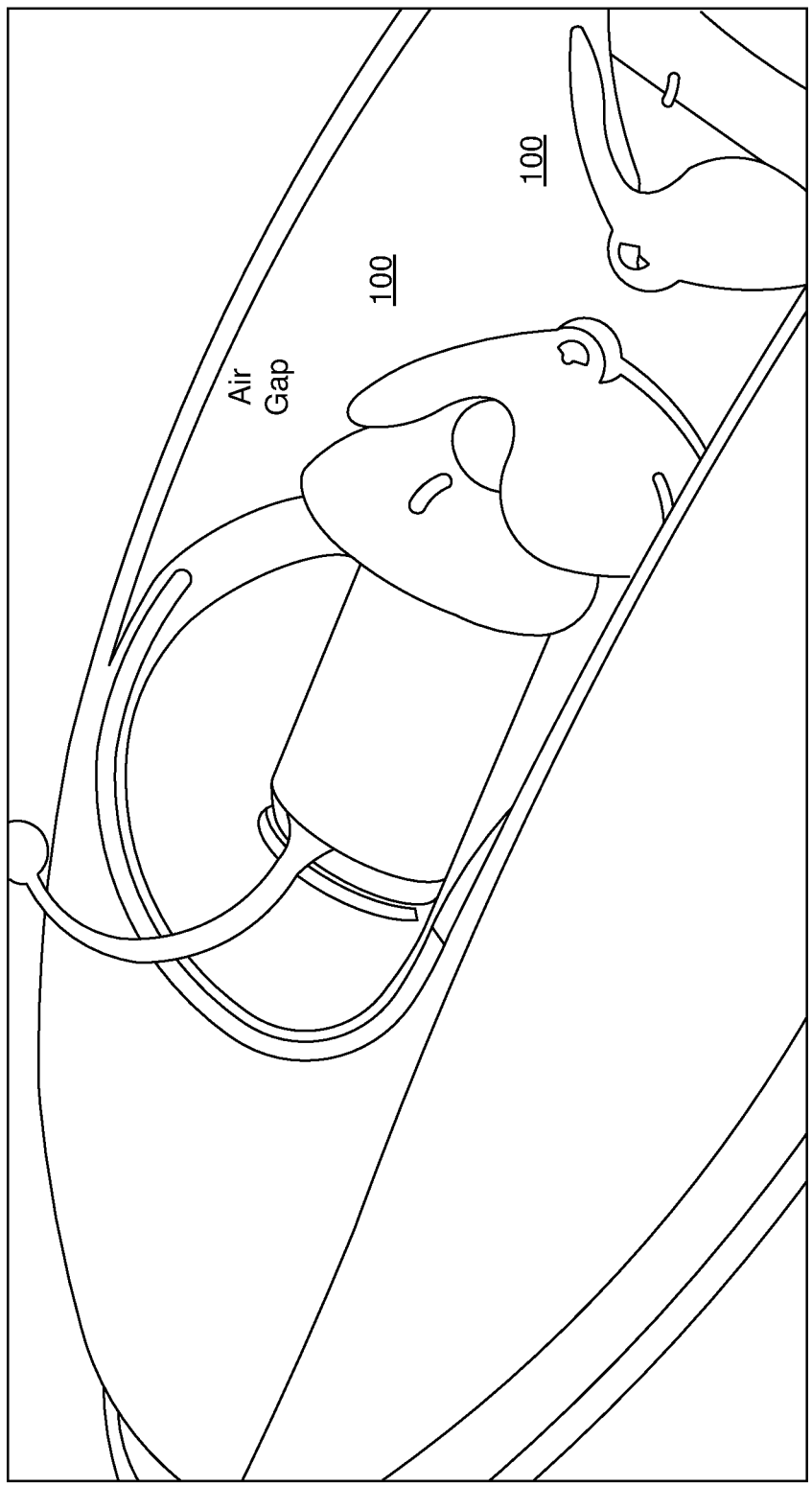
FIG. 3 illustrates a block diagram of an example tip having an initial offset layer of a dome-shaped earmold that is separated by an air gap from one or more offset layers of inner earmolds.

FIG. 3 illustrates a block diagram of an example tip having an initial offset layer of a dome-shaped earmold that is separated by an air gap from one or more offset layers of inner earmolds. Note, both i) the dome-shaped earmold (in the shown example a clover-style and shaped earmold) and ii) at least one or more inner earmolds have multiple bendable members with an air vent on at least one or more of the bendable members for that earmold. Again, in between the first and second offset layers (e.g., rows) of flexible earmolds, in this example, has a large open gap space in between the layer above and below that layer. The initial offset layer of the flexible attachable tip 100 is a dome-shaped earmold that is separated by the large gap from the lower offset layer of the inner earmold. The large air gap provides a space for the bendable member to bend/deform into when being inserted. Again, the flexible earmolds including their bendable members are constructed to bend to a deformed state in order to secure the hearing assistance device in position inside the ear canal, which prevents the hearing aid from falling out of an ear, while still providing both a sound path and an airflow path through the ear canal. (See FIG. 1 for the bendable members being bent.)

In addition, an air space is formed in between each of the individual bendable members of the multiple bendable members making up the flexible earmold for a given layer of the offset layers. Note, individual bendable members on a given layer of earmold have the air space in between these individual bendable members that is offset with respect to the layer above and below that layer. The offset air space and/or individual bendable members ensure that an air flow path will exist through the multiple layers whether in a normal non-bent state or a bent deformed state when inserted in the air. The flexible attachable tips 100 discussed herein may have two or more offset (e.g., non-overlapping) layers of earmolds with an initial outer dome-shaped earmold separated by an air gap from one or more rows/layers of inner earmolds.

Figure 4B:
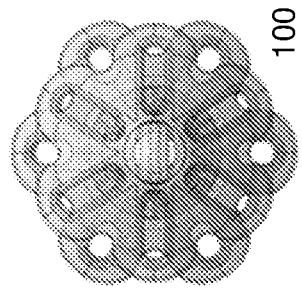
Figure 4D:
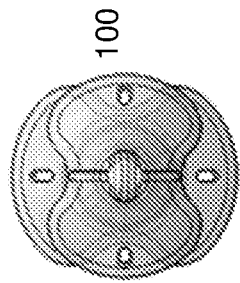
Figure 4A:
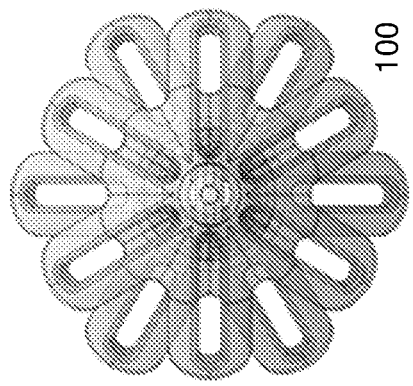
Figure 4C:
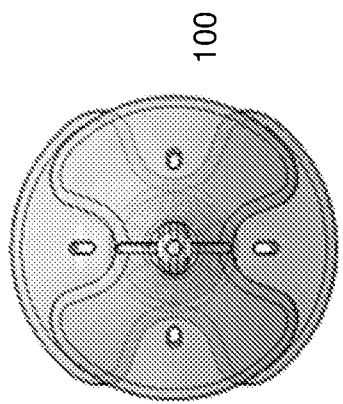

FIGS. 4A to 4D illustrate diagrams of an example set of two or more types of flexible attachable tips that couple via a common clip connection with a snap-to-attach-interface that to the hearing aid, each different type of stock hearing aid tip is specifically constructed to eliminate multiple different hearing aid problems by allowing a user to select a best type of flexible attachable tip 100 option from the set of two or more types of flexible attachable tips 100 available to the user, by factoring in i) a specific hearing environment the user will be in, as well as ii) a user's own hearing loss profile, as well as iii) physical characteristics of the user's own ear canal, such as shape, size, wax build up, etc. FIG. 4A shows a straight on view of an example flexible attachable tip 100 including an initial dome-shaped earmold in the form of an open petal-style and shaped earmold with six bendable members in the initial layer and six more bendable members in the offset layer below the initial layer. FIG. 4B shows a straight on view of an example flexible attachable tip 100 including an initial dome-shaped earmold in the form of an open petal-style and shaped earmold with six bendable members in the initial layer but the physical dimensions of the layers of the petal-shaped bendable members are much smaller so that this tip properly fits into a much smaller ear canal. Both sizes of the open petal-style and shaped earmold can attach to a same hearing aid. FIG. 4C shows a straight on view of an example flexible attachable tip 100 including an initial dome-shaped earmold in the form of a clover-style and shaped earmold with four bendable members and an offset layer below the initial layer also with four bendable members in the shape of a cloverleaf. FIG. 4D shows a straight on view of an example flexible attachable tip 100 including an initial dome-shaped earmold in the form of a clover-style and shaped earmold with four bendable members in the initial layer but the physical dimensions of the layers of the clover-shaped bendable members are much smaller so that this tip properly fits into a much smaller ear canal. All four of these example earmolds can attach to a same hearing aid. Thus, a fundamental feature of the design is manufacturing a single hearing aid that can use multiple different stock hearing aid tips via this common clip connection with a snap-to-attach-interface in order to specifically eliminate multiple different hearing aid problems by allowing a user to select the best hearing aid tip option from the set of hearing tips available to the user factoring in multiple different factors. Each of the multiple flexible attachable tips 100 is designed to specifically mitigate particular hearing aid acoustic, comfort, and/or durability issues. As discussed, each of the multiple flexible attachable tips 100 also come in multiple different physical size ranges (e.g., small—10 mm diameter, medium—11 mm diameter, medium-large—12.5 mm diameter, large—14 mm diameter) to roughly fit different sized ear canals of people. The same hearing assistance device is used but the user can select different types of hearing aid tips to deal with different hearing loss, as well as different hearing environments, allowing the user to select the proper tip for either the hearing environment and/or hearing loss that they want to compensate for as well as a size of the tip that best meets their ear canal needs.

Figure 5A:
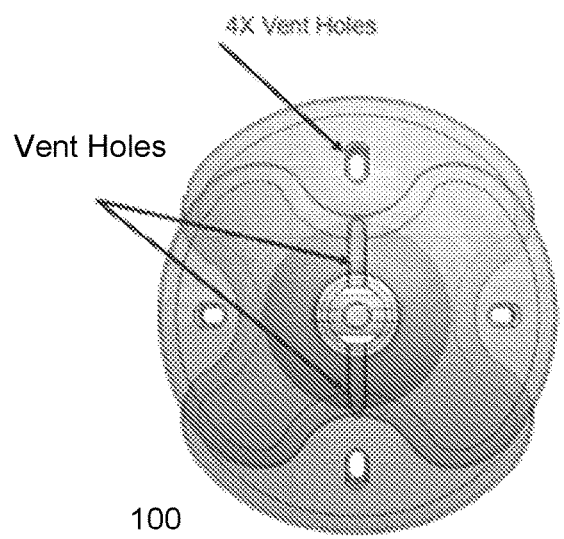
Figure 5B:
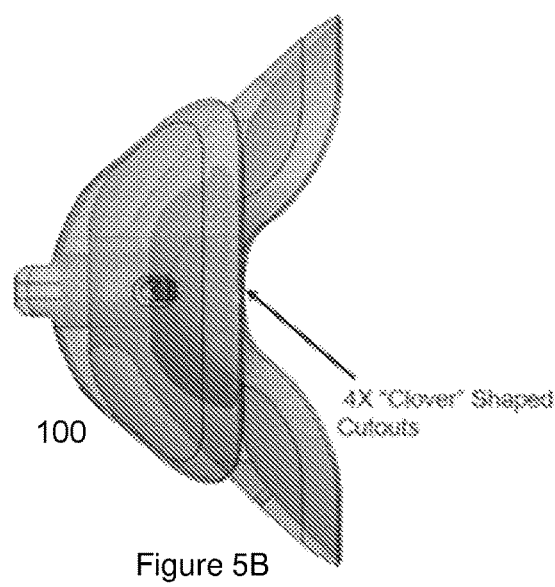
Figure 5C:
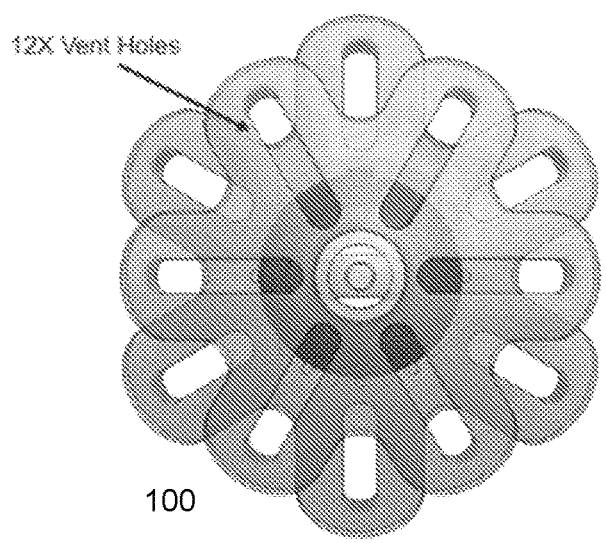
Figure 5D:
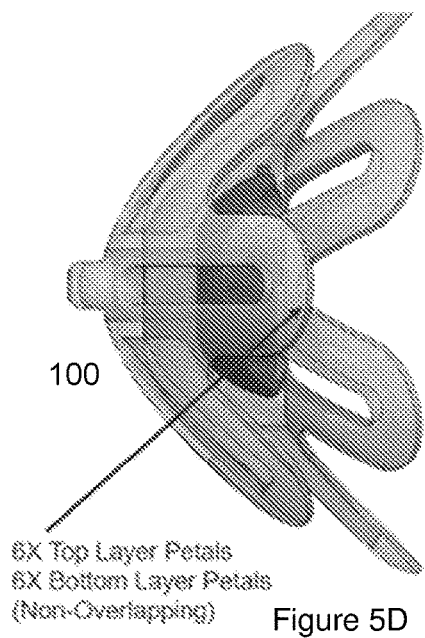

FIGS. 5A to 5D illustrate diagrams of an example set of 1) earmolds that are a clover-style and shaped earmold with multiple bendable members and 2) earmolds that are a petal-style and shaped earmold with multiple bendable members. FIG. 5A illustrates a straight on view of a diagram of an earmold for the flexible attachable tip 100 that has layers of clover-style and shaped earmolds with multiple bendable members. FIG. 5B illustrates a side view of a diagram of an earmold for the flexible attachable tip 100 that has layers of clover-style and shaped earmolds with multiple bendable members. FIG. 5C illustrates a straight on view of a diagram of an earmold for the flexible attachable tip 100 that has layers of petal-style and shaped earmolds with multiple members. FIG. 5D illustrates a side view of a diagram of an earmold for the flexible attachable tip 100 that has layers of petal-style and shaped earmolds with multiple members.

The overall geometry of both hearing aid tips consists of, for example, two layers of silicone earmolds (such as petals), that taper inward towards the front, following the general form of a narrowing ear canal. As seen in FIG. 5B the silicone petals of the flexible attachable tip 100 taper inward from the front (and the clover-shaped members in FIG. 5D) in order to follow the general form of a narrowing ear canal. An initial layer of flexible earmolds is the dome-shaped earmold, which is followed by one or more inner layers of earmold that are conical in shape. This ensures contact with the ear canal walls for proper fitting, and ensures that hearing aid retention is secure and sufficient. The non-overlapping layers of the hearing aid tips are designed to prevent material thickness buildups which may cause discomfort to the user allowing the user to wear the hearing aids for longer periods of time. The conical shape of the earmolds and size can fit tips that allow for natural sound and there is a small distance between the microphone and receiver, allowing hearing aid invisibility. The tapered design allows a better fit.

The example multiple bendable members (e.g., in shape petals and/or cloverleaf cutouts) have structural air space gaps in each layer of the bendable member to conform (when they deform) to the shape of the ear versus a tip in a single layer in the shape of a solid full circle. Also, each petal and/or clover-shaped cutout is a bendable member whose bending and shape deformation can be different and independent from another bendable member (e.g., another petal) forming that tip. Each layer can be formed with multiple bendable members per layer. In these examples, two bendable members with the cloverleaf shape and six bendable members with the petals are shown. Each layer having multiple bendable members makes it a little bit easier to adapt to more shapes without providing too many hotspots of localized pressure against a specific location in the ear canal.

The initial dome-shaped earmold can take form as an open petal-style and shaped earmold with four to ten (e.g., six) bendable members. The open petal-style and shaped earmold can resemble an open petal-shape where each bendable member resembles a petal with a significant portion of the petal having its material removed to allow for more air and sound to pass through the earmold than if the petal was a solid piece of material.

Each individual bendable member has one or more air vents that occupy at least twenty percent of an area of that bendable member. The area of an individual bendable member can be measured by a length of the individual bendable member multiplied by a width of the individual bendable member. In an embodiment, an individual bendable member has one or more air vents that occupy at least 20 to 40 percent of an area of that bendable member in order to supply at least a minimum threshold amount of air flow when the bendable members are bent to the deformed state in order to secure the hearing assistance device in position inside the ear canal. The minimum threshold amount of air flow when the bendable members are bent to the deformed state allows a moisture level present in a user's ear to prevent itching.

The open petal-style and shaped earmold can have one or more circular vent holes in petals and/or an extended slot of a vent hole in the petal shape of the bendable member. The open petal-style and shaped earmold is designed to minimize discomfort while wearing hearing aids for long periods. The open petal-style and shaped earmold tip can reduce also itching and irritation caused within the ear canal due to, for example, a higher level of moisture as compared to a clover-style and shaped tip. In this example, each layer of the open petal-style and shaped earmold consists of six petals that are non-overlapping with each other and offset to once again prevent material thickness buildup. Running across the length of each petal can be an oblong shaped vent, to maximize leakage of sound out of the ear canal when worn in noisy environments. With the air vents and more air gaps, the open petal-style and shaped earmold is a better tip style than the closed clover-style and shaped earmold, for a noisy bar situation because the open petal-style and shaped earmold allows more sound to escape. The open petal-style and shaped earmold through the structurally designed venting patterns is also better when a range of different frequencies are present in the background noise, like at a concert, and for people who don't have a severe hearing loss. The petal-style shaped earmold is suitable and comfortable for listeners with mild to moderate hearing loss and mid and high frequencies. The open petal-style and shaped earmold has larger portions of the bendable member as air vents in order to maximize sound escape channels to have a more natural sound quality.

The open petal-style and shaped mold tip can help reduce the occlusion effect, which reduces one's own voice vibration in the head and jawbone, in order to improve the sound quality being heard in that ear.

The open petal-style and shaped tip helps reduce the occlusion effect and improve sound quality for some by allowing a more open fit in the air canal allowing more airflow into and out of the air canal. The open petal-style and shaped tip is configured to allow a better balance of natural sound that a user can still hear well without the sound being amplified by their hearing aid as well as allow the user to hear amplified sound from their hearing aid.

The initial dome-shape can help to hold mid frequency sound in as well as control feedback by letting less high frequency sound out.

Note, both i) the dome-shaped earmold and ii) at least one or more of the inner earmolds also have multiple bendable members with an air vent on at least one or more of the bendable members for that earmold. In an embodiment, every bendable member has one or more vent holes. Two or more pairs of vent holes are constructed on opposing sides of each layer, as well as a venting channel running down an axis in the top of the tip, allow for leakage of sound out of the ear canal. Mainly, the vent holes are offset to be in a space where there is a first layer with no overlap from a second layer substantially blocking the vent hole. When the multiple petals have a portion of their vent hole covered partially by an overlap section, then the entirety of the vent hole does not pass all the way through and it is a lot less effective. Nonetheless, the overall amount of blocking material area to area for air and sound to flow through can be calculated. The vent holes can establish a pathway for air and/or sound. This is balanced. When we get to an openness ratio, then we have a whole lot bigger ratio of airflow through the air compared to the amount of material there and the tips do not minimize the occlusion effect as much. The airflow allows moisture within the ear to escape and maintain a comfort level (no puddle in the ear) balanced against how much amplified sound is being allowed to escape through the same pathways. Some users with a lesser hearing loss profile can tolerate more leakage of sound and other users with a severe hearing loss profile need the ear canal with the tip in its deformed state to almost be fully occluded. A balance can be achieved through the size and shape of the vent holes, air gaps/cutouts between bendable members of a given earmold, and having multiple layers of earmolds with offset bendable members with respect to bendable members from a different layer and how they relate to each other.

Air flows in between each of the bendable members (petals and/or cutouts) and then within the petals/clover-shaped cutouts each shape controls a maximum/minimum amount of air flow that flows through the tip unobstructed. The vent holes allow a certain amount of airflow through so that the design would have the most benefit to minimize the occlusion effect. Note, across all of the tip designs airflow in between each of the bendable members (petals and/or cutouts) and then within the petals/clover-shaped cutouts each shape controls a maximum amount of air that flows through the tip unobstructed and/or in a tortuous path.

Again, the large vent holes on the bendable members of the open petal-style and shaped earmold maximize the leakage of sound out of the ear canal when worn in noisy environments and allow for a more natural sound quality. There are enough openings in the material forming the tip to have at least airflow; and thus, to allow for temperature and moisture control. The bendable members of the tip when deformed in the ear canal creates some level of tortuous air paths. An example open-style hearing aid tip may have an unvented volume of 87.55 $mm^3$ which has a vented volume of 72.68 $mm^3$ for a tip with a diameter of 12 mm. The ratios of material to open air flow can vary but examples in similar plus or minus ranges like that above can be found to be particularly useful to produce this benefit. During design, there is a balance of the openness ratio of when the flexible attachable tip 100 and earmolds have a whole lot bigger ratio of airflow through the air compared to the amount of material, then the attachable tips 100 do not minimize the occlusion effect as much. However, the smaller the ratio of openness for the flexible attachable tip 100 and earmolds, then comfort from the air flow decreases as well as the ability for natural sound to flow through.

In an embodiment, the petal-style shaped earmold has six bendable members.

The initial layer of dome-shaped earmold is a clover-style and shaped earmold with two to six bendable members, and each individual bendable member has one or more small air vents as part of that bendable member. In an embodiment, the clover-style and shaped earmold has four bendable members.

A clover-style and shaped mold can provide a fuller rounder sound and help control feedback. The clover-style and shaped mold helps because they hold more mid frequency sound in the ear canal to give a fullness of sound. Conversely, the clover-style and shaped mold let less sound out in the high frequencies which helps to control acoustic feedback. The initial dome-shaped earmold can be a clover-style and shaped earmold with multiple (e.g., four) bendable members. The clover-style and shaped earmold can resemble a fairly-closed cloverleaf in shape, where each bendable member resembles a cloverleaf with a small portion of the cloverleaf having its material removed to allow a limited amount of air and sound to pass through the earmold, which is more than if the cloverleaf was a solid piece of material.

The closed style flexible attachable tip 100 with clover-shaped bendable members (e.g., cutouts) and venting strategy have reduced occlusion levels. The closed style flexible attachable tip 100 with clover-shaped bendable members are for people who have higher levels of hearing loss and need higher amplification gain because there's less room for venting to allow some sound to escape. The closed style flexible attachable tip 100 with clover-shaped bendable members would be best for people who want to amplify all kinds of sounds and all kinds of frequencies. The closed style flexible attachable tip 100 with clover-shaped bendable members, through the structurally designed venting patterns, are better when the user is watching TV and/or having a conversation in a non-noisy area (e.g., a meeting) as well as for people who do have a severe hearing loss.

The hearing assistance device at least partially blocks the sound and air pathways in the ear canal, which could cause a problem known as the occlusion effect. The occlusion effect is caused by the increased transmission of sound by bone conduction when the ear canal is blocked and ear conduction is impeded. This occlusion effect results in sounds which are unnatural and uncomfortable for the user. In particular, the user's voice sounds unnaturally higher than normal. Air vents in the earmold as well as air gaps between bendable members in each layer of earmold help to reduce the occlusion effect partially. These air vents and air gaps allow the user to hear some natural sounds through a device positioned in the ear.

The occlusion effect can also cause a sensation of increased loudness (sound pressure level), especially in the low frequencies, a person experiences self-generated sounds (vocalization, chewing, swallowing, walking, and the like), when the ears are covered (occluded). The occlusion effect occurs when an object fills the outer portion of a person's ear canal, causing that person to perceive echo-like "hollow" or "booming" sounds generated from their own voice. The bone-conducted sound travels to the cochlea through different pathways. The bendable members with the cloverleaf shape are designed to be particularly good at mitigating this effect.

Again, each earmold has multiple bendable members with one or more air vents.

The small vent holes on the bendable members of the occluded-style (cloverleaf shaped) hearing aid tip minimize the occlusion effect while also minimizing the leakage of sound out of the ear canal. A paired up set of vent holes on opposing sides of each layer, as well as a venting channel running down an axis in the top of the tip, allow for leakage of sound out of the ear canal. The small vent holes also allow for an air pathway. There is enough material blocking airflow to mitigate a sense of occlusion in the ear acoustically such that we do not get too much low frequency feedback, but still allows for air to flow for comfort and other benefits. Additionally, the occluded-style hearing aid tip may have vent channels for additional venting and to allow some sound to escape to prevent having too much occlusion. An example occluded-style clover-style and shaped earmold may have a volume of 76.83 mm³ for a tip with a diameter of 11 mm with vent hole sizes of approximately 0.4×0.8 mm, positioned approximately 3.25 to 3.485 mm from the center of the hearing aid tip. The ratios of material to open air flow can vary but examples in similar plus or minus ranges like that above can be found to be particularly useful to produce this benefit.

The different styles of hearing aid tips allow the user to select the appropriate hearing aid tip based on the amount of amplification, occlusion, and feedback the user desires and/or required by the user's level of hearing loss and/or the specific hearing environment.

Bendable members are offset in location relative to other bendable members from another earmold in a layer above or below that earmold. Bendable members are offset in location relative to other bendable members from another earmold in a layer above or below that earmold so that the earmold does not totally block the vent hole of another bendable member. The design controls the amount of overlap, by how much the petals-shaped and/or clover-shaped bendable members overlap, the placement of the air space/inter space between bendable members, air gap between layers, and the vent hole(s) in each petals-shaped and/or clover-shaped bendable member itself. Two example distinct tip designs have been shown but many more can be implemented that incorporate features discussed herein.

The flexible attachable tip 100 uses material selection, two or more different shapes of earmolds, two or more different physical dimensions of a same design, and multiple layers in the tip so it can conform to different ear canal sizes and shapes and curvature. The different diameters from ear to ear differ as well as each ear canal naturally tapers at different levels and curves at different levels so being able to have flexible tips that can bend and conform without bunching up too much and without overlapping too much helps to minimize hotspots of pressure. The overlapping here would be the bendable member buckling and then having a solid portion of the earmold block the vent hole in the bendable member and thereby cutoff the channel that allows sound and air to escape.

The size of the air gap/cutouts between individual bendable members of an earmold prevent the buckling by allowing the bendable members enough room to deform/collapse to its state to secure the tip and the attached hearing assistance device in place in the ear canal of that user. Also, the air gap between individual layers of bendable members is physically sized [wide enough] so that each individual offset layer of bendable members of the earmold when in the deformed state to secure the hearing assistance device in place in the ear can remain fully extended rather than having portions of the bendable member bent back over itself when deformed. (e.g., buckling) The earmolds with the multiple bendable members deform to secure the hearing assistance device in position inside the ear canal, which prevents the hearing aid from falling out, even when the user is being very physically active.

Referring back to FIGS. 4A to 4D, in an example, the larger dimensioned petal-style and shaped earmold may have a diameter of 14 mm with a volume if not made with air vents would have an unvented volume of 117.17 mm³ but with the air vents has a volume of 93.82 mm³; and thus, the air vents occupy approximately twenty percent of an area of that earmold. The smaller dimensioned petal-style and shaped earmold in FIG. 4B may have a diameter of 10 mm with a volume if not made with air vents would have an unvented volume of 60.23 mm³ but with the air vents has a volume of 52.16 mm³; and thus, the air vents occupy approximately fourteen percent of an area of that earmold.

The larger dimensioned clover-style and shaped earmold in FIG. 4C may have a diameter of 14 mm with a volume if not made with air vents would have an unvented volume of 117.17 mm³ but with the air vents has a volume of 104.41 mm³; and thus, the air vents occupy approximately eleven percent of an area of that earmold. The smaller dimensioned clover-style and shaped earmold in FIG. 4D may have a diameter of 10 mm with a volume if not made with air vents would have an unvented volume of 60.23 mm³ but with the air vents has a volume of 55.23 mm³; and thus, the air vents occupy approximately nine percent of an area of that earmold.

Physical Sizes

Again, FIGS. 4A to 4D illustrate diagrams of an example set of two or more types of flexible attachable tips 100 via a common clip connection with a snap-to-attach-interface are configured to fit to the hearing aid, each different type of stock hearing aid tip is specifically constructed to eliminate multiple different hearing aid problems by allowing a user to select a best type of flexible attachable tip 100 option from the set of two or more types of flexible attachable tips 100 available to the user. Thus, a single hearing aid that can use multiple different stock hearing aid tips via a common clip connection with a snap-to-attach-interface to a hearing assistance device to specifically eliminate multiple different hearing aid problems by allowing a user to select a best type of flexible attachable tip 100 option from the set of two or more types of flexible attachable tips 100 available to the user, by factoring in i) a specific hearing environment the user will be in, as well as ii) a user's own hearing loss profile, as well as iii) physical characteristics of the user's own ear canal, such as shape, size, wax build up, etc. The different shaped earmolds each use multiple discrete layers, where each layer has multiple bendable members, and one or more of the bendable members has an air vent to allow air flow through that bendable member even when deformed, to specifically eliminate multiple different hearing aid problems by allowing a user to select a best flexible attachable tip 100 option from the set of hearing tips available to the user.

The multiple physical sizes of stock ear tips are available for each design so that the stock ear tips fit tight enough in the ear canal to hold the hearing aid in the ear, while still being comfortable. Within a given type of flexible attach tip there are also different physical sizes of tips within that style of flexible attach tip that are manufactured. Different physical sizes of flexible attach tips within that style of flexible attach tip will each share the general shape and functionality of that type of flexible attach tip. However, the physical sizes and dimensions of shapes and features making up that tip, within that style of flexible attach tip, will be physically larger or smaller in dimensions compared to each other. The different physical dimensions of the flexible attach tip are manufactured because each person's dimensions of their ear canal can be quite different than the ear canal size of another person's ear canal. Thus, a person's in-the-ear-canal hearing assistance device with the flexible attach tip inserted within the person's ear i) may slip due to not being big enough or ii) alternatively may hurt due to being too wide because different people's ear canals' have different interior dimensions.

Physical dimensions of large, medium, and small forms of the flexible attach tip all physically have dimensions to meet and fit within, for example, average dimensions of a large ear canal for a human, average dimensions of a medium dimension ear canal ear canal for a human. The appropriate physical size of a flexible attachable tip 100 (e.g., large versus medium versus small) can be determined, for example, as follows. If the hearing assistance device with the flexible attachable tip 100 attached slides out after a full insertion, then go to a larger dimension flexible attachable tip. If the hearing assistance device with the flexible attachable tip 100 attached cannot be inserted fully without pain, then go to a smaller dimensioned tip of the same type of the flexible attachable tip.

The material selection of Momentive LSR 2740 silicone and the multiple layers in the tip allow for conformation to different ear canal sizes, shapes, and curvatures in order to maximize comfort for the user. The Momentive LSR 2740 silicone is biocompatible and has a durometer reading of 40A to allow the silicone layer to be flexible to conform to the shape of the user's ear canal as well as being able to bond to nylon plastics. The different diameters from ear to ear differ as well as each ear canal naturally tapers at different levels as well as curves at different levels so being able to have flexible tips that can bend and conform prevents bunching up too much, overlapping too much, creating a lot of volume, and/or hotspots of pressure. Alternative materials may, for example, include closed cell foams, open cell foams, EPDM rubber, polyurethane (PUR), thermoplastic polyurethane (TPU), etc. Note, silicone is easier to clean than foam with its pockets and cavities and it just gets really gross over time. The properties of silicone are i) much more easier to manufacture with liquid injection molding than rubber and ii) generally a softer material than rubber so more user comfort when installed in the ear.

Note the ear tips can also be made from soft rubbers, soft foam, and other similar materials.

FIG. 6 illustrates a block diagram of an example of the flexible attachable tip that has a hollow cored-out center of the hearing aid tip in order to provide a channel for amplified sound to pass from a speaker in the hearing assistance device into the ear. The flexible attachable tip 100 also has a hollow cored-out center of the hearing aid tip in order to provide a channel for amplified sound to pass from a speaker in the hearing assistance device into the ear. The sound channel allows sound to go directly into the user's eardrum/tympanic membrane, instead of being rerouted to a different part of the ear, such as back up the ear canal.

FIGS. 6, 7A, and 7B illustrate diagrams of example flexible attachable tips 100 also has, at a front of the flexible attachable tip, a wax bridge component, that is configured to block a direct path for wax to ingress into a sound channel formed in the flexible attachable tip. The flexible attachable tip 100 also has, at a front of the flexible attachable tip, a "wax bridge" component, that is configured to block a direct path for wax to ingress into a sound channel formed in the flexible attachable tip. Thus, at the front of the tip is a "wax bridge" component which resolves wax related clogging issues that result in little to no amplification of sound is one of the most common reasons for hearing aid returns. The wax bridge blocks the direct path for wax to ingress into the hollow sound channel in the tip creating a pathway for sound to escape through the sides. The wax bridge also may be squeezed for easy cleaning of any built up wax. The sound channel must also be long enough to prevent buckling, but also short enough to not fold in on itself when inserted in the ear canal which would cause samples to be blocked.

FIGS. 7A and 7B illustrate diagrams of example flexible attachable tips with i) a clover-style and shaped earmold and ii) a petal-style and shaped earmold that are made of silicone that is over molded over a snap-to-attach-interface made of a hardened material in order to repeatedly connect as well as disconnect to the body of a hearing assistance device. The flexible attachable tip 100 is made of silicone that is over molded over a snap-to-attach-interface made of a hardened material in order to repeatedly connect as well as disconnect to the body of a hearing assistance device. The silicone tip is over molded over a hardened material (such as plastic) "dome" that includes snap-to-attach-interface to allow the user to snap the tip on and off the hearing aid device.

The snap-to-attach-interface is made of a hardened plastic to form a common clip connection to the body of the hearing assistance device in order to allow a set of two or more types of flexible attachable tips 100 to be interchangeable for attachment to a single hearing assistance device.

In terms of the removal of the flexible attachable tip 100 from the device, a user pulls on these petal-shaped/clover-shaped bendable members to remove the tip from the snap fit connection on the hearing aid so enough material should be present to mitigate against breaking the petals/clover-shaped cutouts. However, if the user does break a layer of the hearing aid tip, the second layer may act as a backup so that the hearing aids may still continue to function while the second layer remains intact.

The snap-to-attach-interface allows the hearing aid tips to be interchangeable among devices and backwards compatible for different types of tips. The snap-to-attach-interface also provides a tactile and audible feedback to the user to ensure the tip is secured onto the hearing aid. The connection to the hearing assistance device can be a female plastic snap dome clip in the tip to a male plastic clip on the hearing assistance device to a single hearing aid that can use multiple hearing aid tips via a common clip connection to the hearing aid to specifically eliminate multiple different hearing aid problems by allowing a user to select a best hearing aid tip option from the set of hearing tips available to the user. The snap-to-attach-interface allows the flexible attachable tip 100 to be removable and replaceable, creating opportunities for the user to more easily clean the tips without worrying about damaging an attached hearing assistance device and replace the flexible attachable tip 100 with the snap-to-attach-interface when there is damage or wear from prolonged use, and/or if another style of tip is more beneficial for the hearing environment. The flexible attachable tip 100 with the snap-to-attach-interface needs the shape to have the correct angles and geometry, in order to make the removal for the user simple, but not disconnect from the hearing assistance device without a non-trivial amount of force to that the adequate user experience and prevent safety risk. The over molded hard plastic aspect is special because of its snap. Again, the snap-to-attach-interface is not simply a silicon to silicon snap connection between the hearing assistance device and the tip, which doesn't provide things like a tactile indication that the hearing aid is on the device correctly as well as an audible click indication.

The snap-to-attach-interface made of a hard plastic allows the multiple different hearing aid tips to be interchangeable for a single hearing assistance device, where the multiple different stock hearing aid tips via a common clip connection with a snap-interface fit to the hearing aid to specifically eliminate multiple different hearing aid problems by allowing a user to select the best hearing aid tip option from the set of hearing tips available to the user, by factoring in i) the specific hearing environments, as well as ii) the user's own hearing loss profile, as well as iii) physical characteristics of the user's own ear canal, such as shape, size, wax build up, etc.

A flexible attachable tip 100 for a hearing assistance device is provided for insertion into a person's ear. A hearing aid has a microphone for picking up sound connected to an amplifier for the amplification of the signals from the microphone and an output receiver for producing the amplified sound in a person's ear canal.

The hearing aid case may be configured to be worn inside the ear canal (ITE) of a user and contains a microphone, a processor unit, and a speaker for picking up sound from the microphone and an output receiver with an amplifier for producing the amplified sound in a person's ear canal. The ear tip may be configured to fit within the ear canal while allowing sounds outside and within the ear to pass-through the ear canal around the ear tip. The flexible attachable tip 100 is configured to fit within the ear canal while allowing sounds outside and within the ear to pass-through the ear canal around the ear tip.

Generally, hearing loss is not uniform over the entire audio frequency range. For example, hearing loss for sounds at higher audio frequencies, such as above 2,000 Hz, will be more pronounced for some people while hearing loss for sounds at lower frequencies will be more pronounced for other people.

The flexible attachable tip 100 for a hearing assistance device with its hearing assistance device is a virtually invisible ITE, rechargeable, as well as a comfortable hearing assistance device that is capable for compensating for severe high-frequency hearing loss. The hearing aid can couple to an on-the-go charging case and a personalized mobile app.

The flexible attachable tip 100 with its earmolds has an adjustable dome which reduces the occlusion effect and can be used without an expensive custom made earmold, and provides a comfortably fitting device.

The flexible attachable tip 100 has layer of earmolds to be an adjustable securing mechanism to transition from a first state to a secure the hearing assistance device when inserted into the internal space or opening within an ear. The adjustable securing portion is configured for positioning and maintaining a base of the hearing assistance device at a distance from a designed location along the internal space or opening. The adjustable securing portion of the earmolds is configured to allow external sound to be transmitted there past when the securing mechanism is secured in the internal space or opening in the ear.

In an embodiment, the hearing aid device with both shapes of earmolds may have similar measured aided-responses, which suggests there is minimal difference in the hearing-aid output gain for the two different flexible attachable tips. The hearing aid may not sound louder or softer with one clip tip compared to the other but will affect certain frequencies within that sound differently.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures can be made from the foregoing design and embodiments without departing from the scope afforded by the following claims, which scope is only limited by the claims when appropriately construed.

What is claimed is:

1. An apparatus, comprising:
    a flexible attachable tip constructed to repeatedly connect as well as disconnect to a body of a hearing assistance device, and
    where the flexible attachable tip comprises two or more offset layers of flexible earmolds including an initial offset layer of the flexible attachable tip configured as part is a dome-shaped earmold separated by an air gap from one or more offset layers of inner earmolds, where both the initial offset layer and at least a first offset layer configured as a first inner earmold have multiple bendable members with an air vent constructed into at least one or more of the bendable members for that earmold, where an air space is formed in between each of the individual bendable members of the multiple bendable members making up the flexible earmold for a given layer of the offset layers, where the flexible earmolds including their bendable members are constructed to bend to a deformed state in order to secure the hearing assistance device in position inside an ear canal, and where the dome-shaped earmold is a petal-style and shaped earmold with four to ten bendable members, and each individual bendable member includes one or more air vents that occupy at least ten percent of an area of the earmold, where an area of a first individual bendable member is measured by a length of the first individual bendable member multiplied by a width of the first individual bendable member in order to supply at least a minimum threshold amount of air flow when the individual bendable members are bent to the deformed state in order to secure the hearing assistance device in position inside the ear canal.

2. The apparatus of claim 1, wherein the air gap between individual layers of bendable members is physically sized so that the first offset layer, when in the deformed state, is configured to secure the hearing assistance device in place in the ear canal, so that the individual bendable members do not bend back over themselves when in the deformed state.

3. The apparatus of claim 1, wherein the initial offset layer of the two or more offset layers followed by remaining offset layers of the two or more offset layers that are conical in shape.

4. The apparatus of claim 1, wherein the flexible attachable tip is configured with a hollow cored-out center of the flexible attachable tip in order to provide a sound channel for amplified sound to pass from a speaker in the hearing assistance device into the ear canal.

5. The apparatus of claim 1, wherein a front of the flexible attachable tip includes a wax bridge component that is configured to block a direct path for wax to ingress into a sound channel formed in the flexible attachable tip.

6. The apparatus of claim 1, wherein the flexible attachable tip is made of silicone that is over molded over a snap-to-attach-interface made of a hardened material in order to repeatedly connect as well as disconnect to the body of the hearing assistance device.

7. The apparatus of claim 1, wherein the flexible attachable tip includes a snap-to-attach interface made of a hardened plastic to form a common clip connection to the body of the hearing assistance device in order to allow a set of two or more types of flexible attachable tips to be interchangeable for attachment to a same instance of the hearing assistance device.

8. The apparatus of claim 1, wherein the hearing assistance device is a hearing aid, and a set of two or more types of flexible attachable tips are configured, via a common clip connection with a snap-to-attach-interface, to couple to the hearing aid, where each different type of flexible attachable tip is specifically constructed in physical dimensions of the individual bendable members and a shape of the individual bendable members for that type of flexible attachable tip to eliminate multiple different hearing aid problems by allowing a user to select a best type of flexible attachable tip option from the set of two or more types of flexible attachable tips available to the user of the hearing aid, where the user can select the best type of flexible attachable tip option from the set of two or more types of flexible attachable tips available to the user of the hearing aid by factoring in i) a specific hearing environment the user will be in, as well as ii) a user's own hearing loss profile, as well as iii) physical characteristics of the user's own ear canal.

9. A method of manufacturing a flexible attachable tip, comprising:
  manufacturing the flexible attachable tip to repeatedly connect as well as disconnect to a body of a hearing assistance device, and
  manufacturing the flexible attachable tip to have two or more offset layers of flexible earmolds, where an initial offset layer of the flexible attachable tip is a petal-style and shaped earmold that is separated by an air gap from one or more offset layers of inner earmolds,
  wherein the petal-style and shaped earmold includes a first plurality of bendable members ranging in number from four to ten bendable members, and each individual bendable member of the first plurality of bendable members includes one or more air vents that occupy at least ten percent of an area of the earmold and an area of a first individual bendable member of the first plurality of bendable members is measured by a length of the first individual bendable member multiplied by a width of the first individual bendable member in order to supply at least a minimum threshold amount of air flow when the first plurality of bendable members are bent to a deformed state in order to secure the hearing assistance device in position inside an ear canal,
  wherein at least a first offset layer of the inner earmold includes a second plurality of bendable members with an air vent constructed into at least one or more of the second plurality of bendable members for the inner earmold, where an air space is formed in between each individual bendable members of the second plurality of bendable members and at least the second plurality of bendable members are constructed to bend to a deformed state in order to secure the hearing assistance device in position inside an ear canal.

10. The method of manufacturing of claim 9, further comprising:
  manufacturing the air gap between the initial offset layer and the first layer is physically sized so that the second plurality of bendable members of the first offset layer, when in a deformed state, are configured to secure the hearing assistance device in place in the ear canal, so that the second plurality of bendable members do not bend back over themselves when in the deformed state.

11. The method of manufacturing of claim 9, further comprising:
  manufacturing the flexible attachable tip to have a hollow cored-out center of the flexible attachable tip in order to provide a sound channel for amplified sound to pass from a speaker in the hearing assistance device into the ear.

12. The method of manufacturing of claim 9, further comprising:
  manufacturing the flexible attachable tip to have a wax bridge component located at a front of the flexible attachable tip, where the wax bridge component is configured to block a direct path for wax to ingress into a sound channel formed in the flexible attachable tip.

13. The method of manufacturing of claim 9, further comprising:
  manufacturing the flexible attachable tip to be made of silicone that is over molded over a snap-to-attach-interface made of a hardened material in order to repeatedly connect as well as disconnect to the body of the hearing assistance device.

14. The method of manufacturing of claim 9, further comprising:

manufacturing a snap-to-attach-interface in the flexible attachable tip to be made of a hardened plastic to form a common clip connection to the body of the hearing assistance device in order to allow a set of two or more types of flexible attachable tips to be interchangeable for attachment to a same instance of the hearing assistance device.

15. The method of manufacturing of claim 9, further comprising:

manufacturing a set of two or more types of flexible attachable tips to have a snap-to-attach-interface to couple to the hearing assistance device, where each different type of flexible attachable tip is specifically constructed in physical dimensions of the individual bendable members and a shape of the individual bendable members for that type of flexible attachable tip to eliminate multiple different hearing aid problems by allowing a user to select a best type of flexible attachable tip option from the set of two or more types of flexible attachable tips available to the user of the hearing aid, where the user can select the best type of flexible attachable tip option from the set of two or more types of flexible attachable tips available to the user of the hearing aid by factoring in i) a specific hearing environment the user will be in, as well as ii) a user's own hearing loss profile, as well as iii) physical characteristics of the user's own ear canal.

16. A flexible attachable tip constructed to repeatedly connect as well as disconnect to a body of a hearing assistance device, the flexible attachable tip comprising:

one or more offset layers forming inner earmolds; and
an initial offset layer forming a earmold and separated by an air gap from the one or more offset layers,
wherein each of i) the initial offset layer and ii) at least a first offset layer of the one or more offset layers comprises a plurality of bendable members with an air vent constructed into at least one or more of the bendable members, an air space is formed in between each of the individual bendable members of the plurality of bendable members, and each of the plurality of bendable members is constructed to bend to a deformed state in order to secure the hearing assistance device in position inside an ear canal, and
wherein the initial offset layer is a petal-style and shaped earmold with four to ten bendable members and each individual bendable member of the four to ten bendable members includes one or more air vents that occupy at least ten percent of an area of the earmold, where an area of a first individual bendable member is measured by a length of the first individual bendable member multiplied by a width of the first individual bendable member in order to supply at least a minimum threshold amount of air flow when the individual bendable members are bent to a deformed state.

17. The flexible attachable tip of claim 16, wherein the air gap between individual layers of bendable members is physically sized so that the first offset layer, when in the deformed state, is configured to secure the hearing assistance device in place in the ear canal, so that the individual bendable members do not bend back over themselves when in the deformed state.

18. The flexible attachable tip of claim 16, wherein the initial offset layer of the two or more offset layers is followed by one or more remaining offset layer of the two or more offset layers that are conical in shape.

19. The flexible attachable tip of claim 16, wherein the flexible attachable tip is configured with a hollow cored-out center of the flexible attachable tip in order to provide a sound channel for amplified sound to pass from a speaker in the hearing assistance device into the ear canal.

20. The flexible attachable tip of claim 16, wherein a front of the flexible attachable tip includes a wax bridge component that is configured to block a direct path for wax to ingress into a sound channel formed in the flexible attachable tip.

21. The flexible attachable tip of claim 16 is made of silicone that is over molded over a snap-to-attach-interface made of a hardened material in order to repeatedly connect as well as disconnect to the body of the hearing assistance device.

22. The flexible attachable tip of claim 16 comprises a snap-to-attach interface made of a hardened plastic to form a common clip connection to the body of a hearing assistance device.

* * * * *